United States Patent Office 3,558,176
Patented Jan. 26, 1971

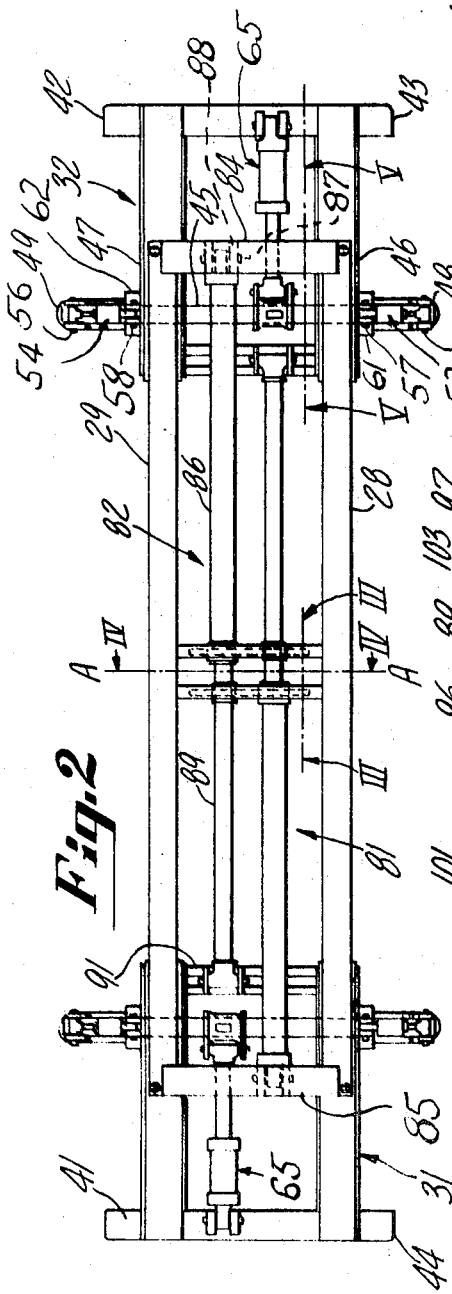

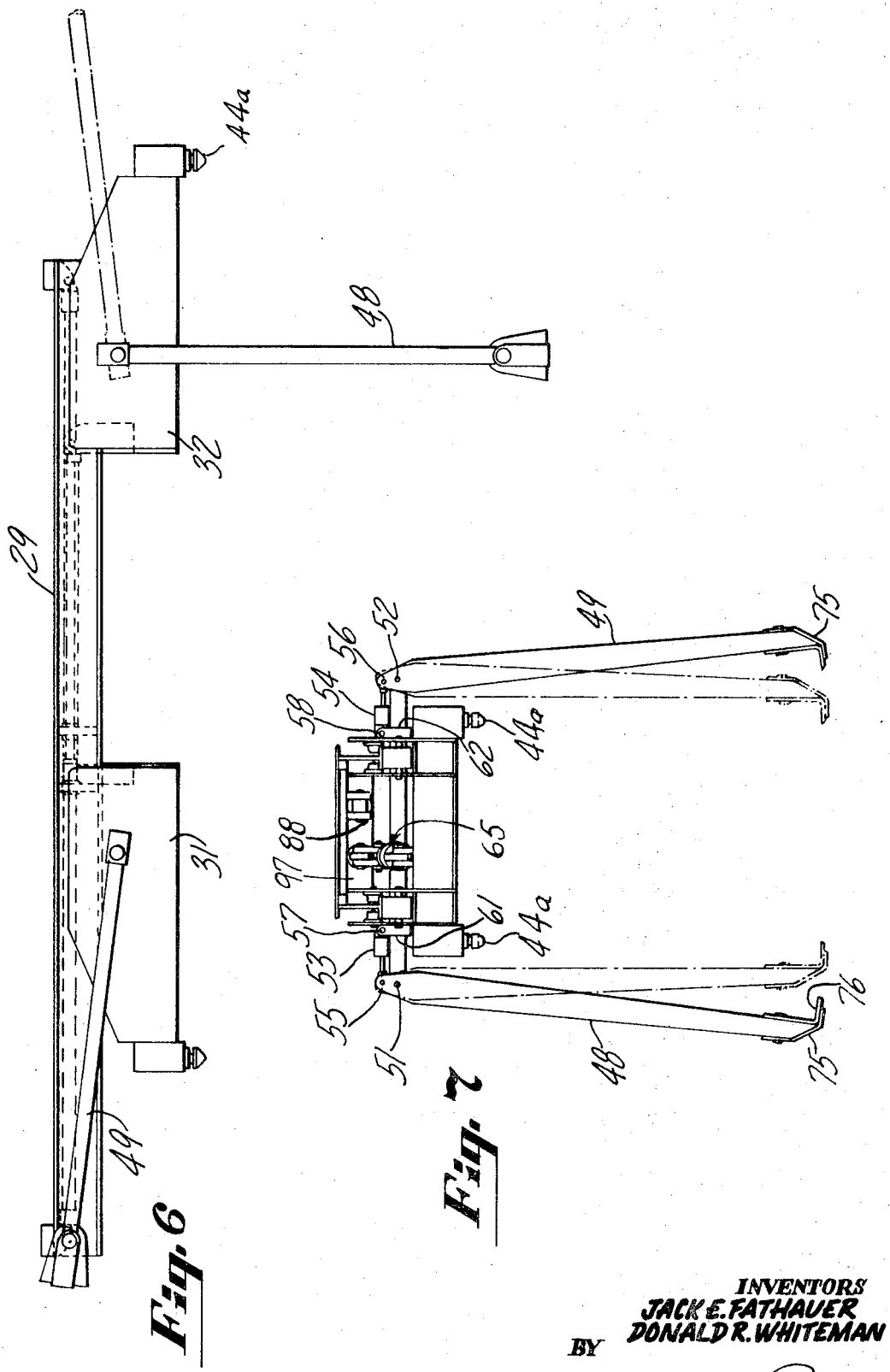

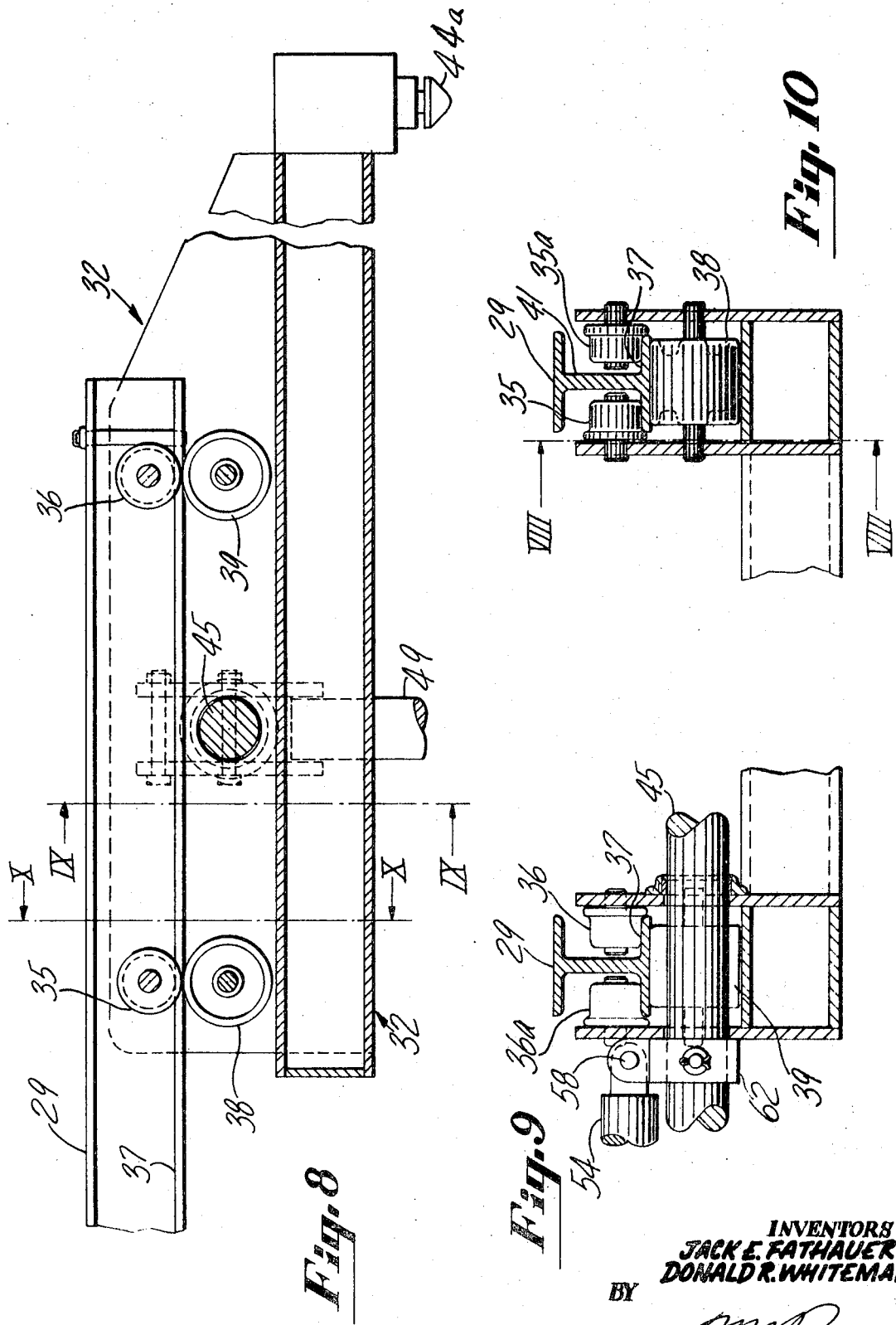

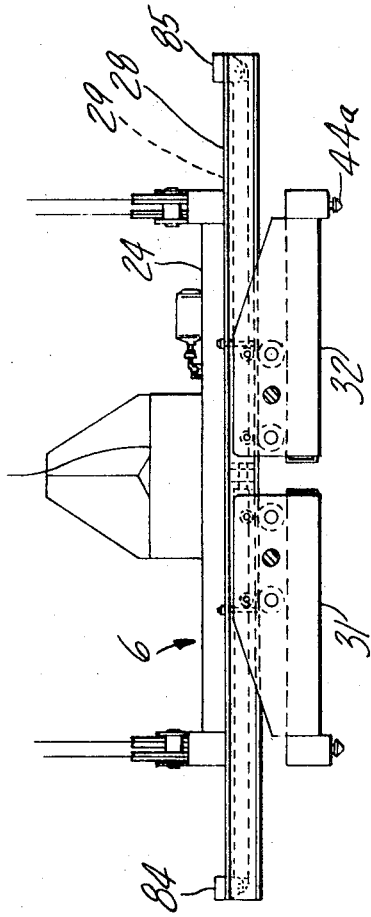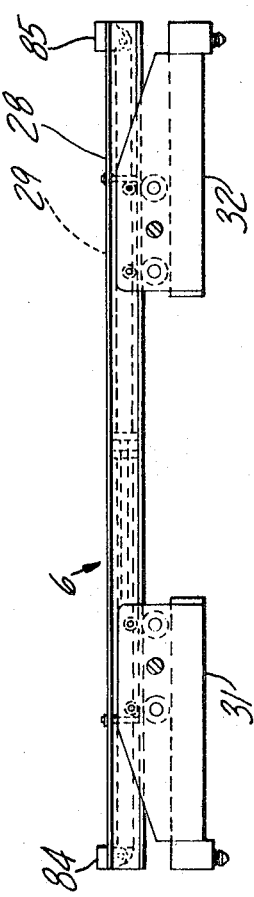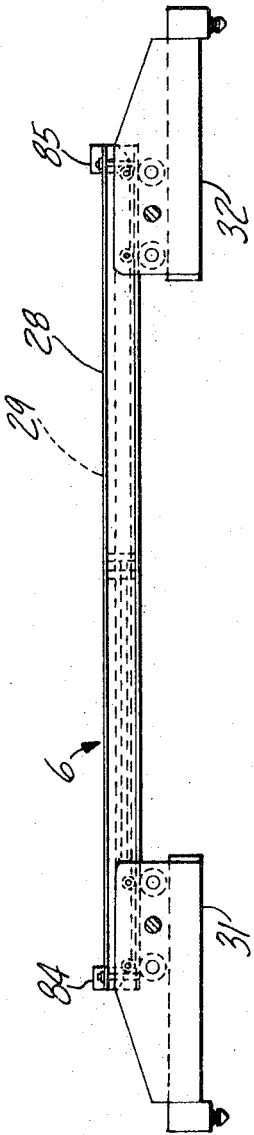

1

3,558,176
EXPANDABLE SPREADER AND GRAPPLING
DEVICE FOR CARGO CONTAINERS AND
TRAILERS
Jack E. Fathauer and Donald R. Whiteman, Roxboro, N.C., assignors to Midland-Ross Corporation, Cleveland, Ohio, a corporation of Ohio
Filed Oct. 7, 1968, Ser. No. 765,404
Int. Cl. B66c 1/00
U.S. Cl. 294—67               7 Claims

ABSTRACT OF THE DISCLOSURE

A cargo-handling device which embodies essential features of a cargo-container spreader equipped with both grappling mechanism and top-lifting latching mechanism, and constructed to be adjustably extendable in its lengthwise direction to adapt the device for lifting highway trailers and cargo containers of various lengths.

A spreader in accordance with this invention is particularly suitable for use around a modern railway freight yard wherein cargo containers and piggy-back trailers varying substantially in length are transferred between cars, docks, and other types of basic carriers or supports. The equipment for hoisting the containers or trailers may take the form of gantry or cantilever cranes, or straddle-carriers or front-loading types of non-track mobile vehicles equipped with single or multiple point suspension of spreaders or other devices for attaching to the load. At present, the industry is somewhat hampered by lack of multiple purpose equipment by which a single vehicle or crane and the associated device for connecting with a load is capable of attaching to any one of the various types of container or trailer-type loads received by a freight yard.

It is an object of the present invention to provide equipment for platform-to-platform transferral of packages of cargo of bulk comparable to that of cargo containers and highway trailers, such as the containers or trailers themselves, which may be adjusted for handling different types of packages simply by operation of the equipment without any substitution of adapting parts.

Specific objects related to the foregoing object are: to provide a spreader which may be connected with different types of cranes and movable lifters; to provide a spreader which is longitudinally adjustable for lifting integral cargo packages of different lengths; and to provide a spreader incorporating grappling as well as top-lifting mechanisms for connecting with such cargo packages.

In brief, the invention resides essentially in a device which may be termed generally as a spreader comprising a base frame providing an overhead track, such as a pair of parallel H-beams; a pair of carriages suspended by, e.g., rollers on the track, and means such as hydraulic jacks acting simultaneously between the carriages and the track to adjust the carriages to a proper spreader length for picking up a cargo container or other rigid integral load. The carriages comprise both latching means for attaching to top portions of containers and grappling arms suitable for connecting the spreader with cargo containers or highway trailers. The grappling means is retractable at least to the level of the carriages as when using the latching mechanism. The carriages are adjustable to different load lengths to enable use of either the latching mechanism or the grappling mechanism.

In the drawing with respect to which the invention is described:

FIG. 2 is a plan view of the spreader of FIG. 1 with super-structure removed and the grappling arms shifted to their vertical positions;

FIG. 3 is a fragmentary section in elevation taken along line III—III of FIG. 2;

FIG. 4 is a fragmentary section in elevation taken along line IV—IV and the transverse axis A—A of the spreader track;

FIG. 5 is a fragmentary elevation in section taken along line V—V of FIG. 2 to especially illustrate portions of the carriage and hydraulic actuating mechanisms;

FIG. 5a is a fragmentary elevation showing a mechanism modified with respect to FIG. 5 for swinging the grappling arms;

FIG. 6 is a schematic side elevation of a portion of the spreader of the previous figures illustrating various positions of the carriages and the grappling arms;

FIG. 7 is a fragmentary end elevation of the spreader of FIG. 1 shown with superstructure removed;

Figure 1:
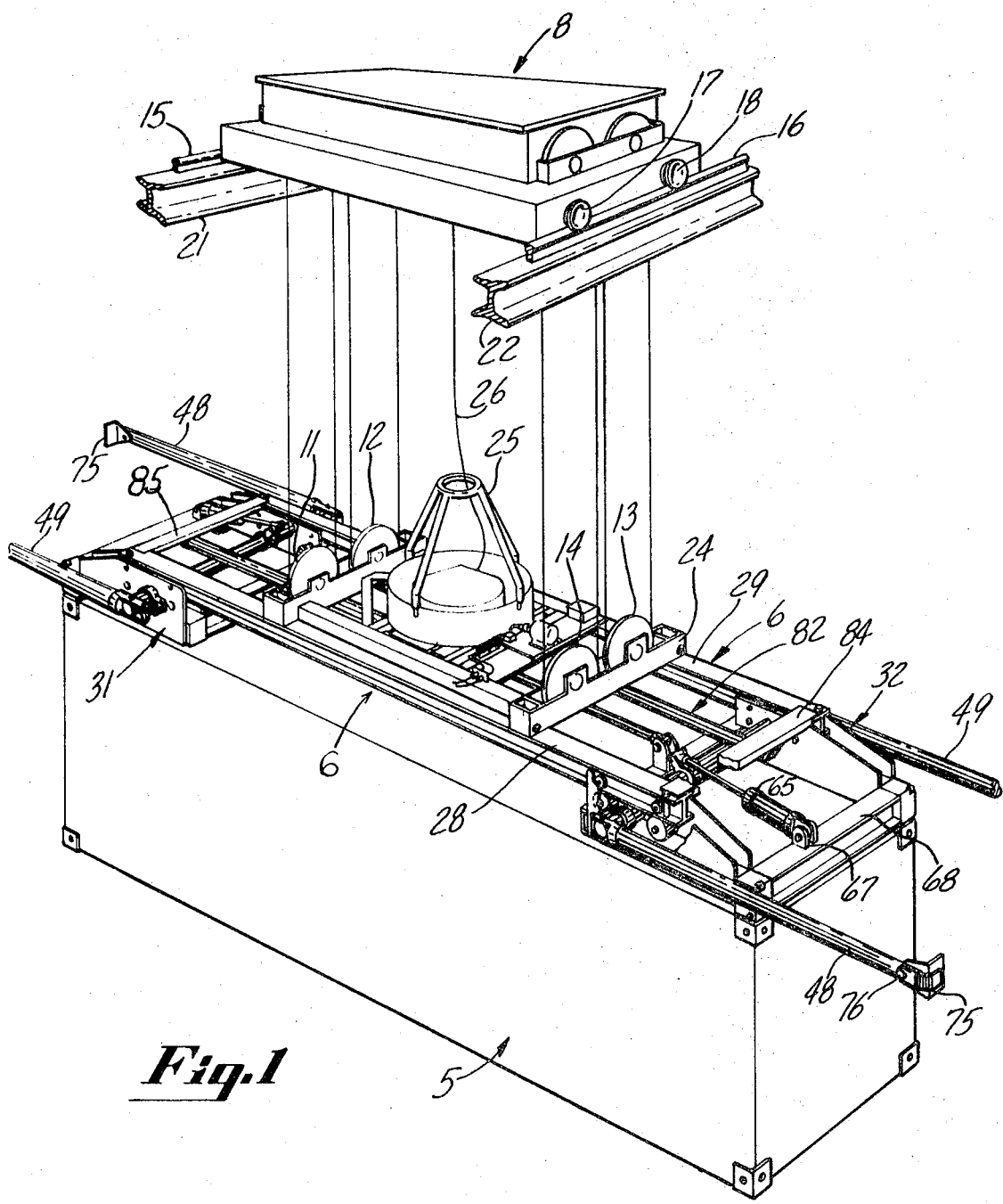
FIG. 1 is a fragmentary perspective view of a cargo container, a spreader in accordance with this invention, and crane portions for lifting the container and the spreader.

FI7. 8 is a fragmentary elevation in cross section taken along line VIII—VIII of FIG. 10 showing especially the roller structure of a carriage;

FIG. 9 is a fragmentary elevation in cross section taken along line IX—IX of FIG. 8;

FIG. 10 is a fragmentary elevation in cross section taken along line X—X of FIG. 8; and FIGS. 11, 12 and 13 are fragmentary schematic side elevations of the spreader with grappling arms omitted illustrating various positions of the carriages for mating the spreader with cargo containers.

FIG. 1 illustrates a container 5 interlocked by latching mechanism to a spreader 6 which, along with its load, is suspended by a cable system from a truck 8 in the embodiment shown. The superstructure of the spreader includes four sheaves 11, 12, 13 and 14 interlaced by cable with four corresponding sheaves of the truck 8 to achieve what is known as "four point" suspension. The truck has rolling means, such as the rollers 17, 18 by which it rests on tracks 15, 16. The beams 21, 22 may be, for example, members of a ship superstructure, gantry cranes, straddle-carrier, or the truck 8 may be stripped of its rollers, e.g., 17, 18, and made a fixed portion of the elevator of a mobile front-end loader. However, although "four point" suspension facilitates stable handling of loads, the invention is not limited to this mode of suspension and loads may be handled by spreaders of the type to be herein disclosed by double point or "single-point" suspension systems well known to those familiar with the known container handling systems. The sheaves 11–14 are contained in a frame 24 forming a part of the spreader superstructure also useful for supporting a cable basket 25 from which an electrical cable 26 pays into and out as the spreader is raised or lowered with respect to the truck 8. The frame 24 is also useful for supporting any hydraulic pressure-generating system (not shown) used as a source of hydraulic power for elements of the spreader to be described hereinbelow since it is necessary to reserve certain regions below the frame 24 for elements of the spreader which must necessarily be disposed below the frame 24.

Proceeding now to the essential features of the invention, the spreader 6 comprises a track, i.e., a pair of rails 28, 29 in the form of H or I beams on which are suspended a pair of carriages 31, 32 in the manner shown by FIGS. 8 and 10. Each carriage comprises a rigid chassis in which guide means, such as rollers, are rotatably journaled to permit the carriage to move toward and away from the middle of the frame, i.e., along guide portions of the track, such as the bottom flanges of both rails. Regardless of loading, the carriage is prevented from tilting relative to the track by guide means spaced longitudinally along the track, such as rollers disposed above and below each lower flange of the rails. For example, FIG. 8 shows that a pair of horiznotally and longitudinally spaced upper smaller rollers 35, 36 engage the upper surface of a lower rail flange 37. Larger horizontally and longitudinally spaced lower rollers 38, 39 are mounted in the carriage 32 in vertically spaced relation with the rollers 35, 36, respectively, to engage the undersurface of flange 37 at just enough clearance with the corresponding vertically related upper roller to receive the flange 37 therebetween. Loading of the carriage 32 will cause the flange 37 to be pressured primarily by rollers 38, 36 and the rollers in coaxial relation with these rollers, including roller 36a and coaxial rollers in the side of the carriage associated with rail 28.

As indicated above, the carriages 31, 32 include both latching and grappling mechanisms by which the spreader is able to attach to a load. The carriages include latching units 41, 42, 43, 44 as shown in FIG. 2 which have box-like housings and latch elements 44a of standard design. As shown, the latch 44a is movable with respect to the housing of its corresponding unit and depends from such housing in order to enter a receptacle therefor in the top corner of a container. The latches shown are intended to typify the A.S.A.–I.S.O. standard spreader and container connecting mechanism in common use throughout the United States. The latches are operated by standard hydraulic or pneumatic cylinder and lever systems depicted by various U.S. patents which, under the circumstances of the present invention, would be mounted on the carriages 31, 32. As hereinbefore indicated, hydraulic reservoir and pumping apparatus is preferably carried on the frame 24 of the superstructure and connected to mechanisms on the carriages served thereby by flexible hoses (not shown). It will be noted that guiding means connecting the carriage with the track, i.e., the rollers 35, 36, 38, 39, are spaced longitudinally toward the middle of the spreader frame from latching units 42, 43, or in the case of the other carriage, units 41, 44.

Another essential feature of the invention consists in the trailer or container grappling mechanism included as a portion of the carriages 31, 32 including hydraulic servo-mechanisms for retracting grappling arms from a generally vertical plane in which they may be engaged with a load to a horizontal or other plane in which the arms are in an out-of-the-way position for facilitating the use of the latching mechanism. Each carriage further includes a servo-mechanism for adjusting the distal termini of the grappling arms between a position under the load and a position in lateral clearance with the load. With reference to carriage 32 in FIG. 5, each carriage provides a transverse shaft 45 supported in both radial and end-wise bearing relation with the opposite housing portions 46, 47 of the carriage associated with 28, 29, respectively. As shown by several of the figures, a shaft 45 is located on the carriage relative to the latching unit longitudinally inwardly from the units toward the middle of the frame. The shaft 45 is disposed between longitudinally inward and outward sets of rollers of the carriage. The grappling mechanism further provides arms 48, 49 attached by pins 51, 52, respectively, at opposite ends of the shaft along pivotal axes which may, as shown, pass through the shaft axis. Motion of the arms 48, 49 about respective axes is controlled by fluid cylinder assemblies 53, 54 pivotally connected to respective arms by pins 55, 56. The other ends of the cylinder assemblies 53, 54 are attached by pins 57, 58 to collars 61, 62 which have clevis portions for receiving a bearing extension of the cylinder of each assembly with the respective pin 57, 58 passing therethrough. The collars 61, 62 are fixed to the shaft 45 whereby they provide not only anchors for the cylinder assemblies but end-thrust bearings which may engage the sides of the carriage frame structure to secure the shaft 45 against axial movement.

FIG. 7 illustrates two different positions of the arms 48, 49 (the closer position of the arms being indicated in dot-dash lines). The other full line position shows the arms 48, 49 relatively angled to dispose the termini thereof outwardly from each other sufficiently to clear the sides of a container or trailer. These shifts of position are effected, preferably simultaneously, by the cylinder assemblies 53, 54.

Each carriage further comprises fluid, preferably hydraulic, servo-mechanism for rotating the shaft 45; hence, the arms 48, 49 to the position as shown in FIG. 1. Such mechanism is provided as a cylinder assembly 65 having a pin-receiving projection of its cylinder 66, extending into a bifurcate bearing 67 mounted on a cross tie 68 of the carriage. The piston rod 69 is pinned to a crank 71 secured to the shaft 45 in a manner to allow angular movement of the shaft through approximately 45°. As shown, the shaft 45 is connected with the cylinder unit 65 in a manner to cause positioning of the arms 48, 49 longitudinally outwardly of the spreader. If preferred, the crank 71 may be also positioned on the shaft 45 to enable rotation of the arms 48, 49 longitudinally inwardly from the shaft 45. FIG. 5a illustrates a rack 73 and pinion 74 connection for connecting the cylinder unit 65 with the shaft 45 to accomplish rotation of the grappling arms to any angular extent desired. As shown, the termini of the arms comprise angle elements turned transversely inwardly toward each other. If desired, each element may be made pivotable with respect to the shank of the arm by a pin 76.

FIGS. 11, 12 and 13 illustrate three of the many positions possible in adjusting the carriages 31, 32 lengthwise of the rails 28, 29. The carriages 31, 32 are traversed lengthwise of the rails by cylinder units 81, 82. Each unit is anchored by one end on a cross tie 84 or 85 of the rails and by its other end on the carriage adjacent the opposite end of the rails. For example, the cylinder 86 of the unit 82 is attached by pin 87 to a clevis 88 mounted on the cross tie 84. The piston rod 89 of unit 82 is anchored by a clevis and eye connection to a cross tie 91 of the carriage 31. In a similar manner the carriage 32 is connected by cylinder unit 81 to the cross tie 85 for the rails positioned normally over the carriage 31. The space between the rails 28, 29 is maintained open for disposition of the cylinder units 81, 82 therebetween. The cylinder units, because of their considerable length, are arranged with their axes in generally, if not precisely, parallel relationship. Since the force needed to adjust the carriages is relatively small, it is desirable from an economic standpoint to use cylinder units 81, 82 of which the parts are of minimal dimensions as measured in transverse cross section. Hence, since such small gauge units have low beam strength because of their lengths, they may be supported against buckling as shown in FIGS. 3 and 4, wherein the rod-end portions 94, 95 of the cylinders of units 81, 82 are supported within cross webs 96, 97. The cross webs 96, 97 are in turn supported by pairs of transverse channels 101, 102 in the one case and 103, 104 in the other case. Each web has extending therethrough the piston rod of the other cylinder unit. For example, the piston rod 89 extends through a hole 105 in the web 96. Further support of the units is possible by providing a loose fitting bearing within the hole 105 fixed to the web 96 which will stabilize the piston rod against any significant lateral movement. In supporting the cylinder end portions 94, 95 against lateral movement, no such bearing is needed.

What is claimed is:

1. Equipment for handling cargo containers including a spreader comprising:

a base frame providing an overhead track centered with respect to a longitudinal normally-horizontal axis;

a pair of carriages suspended on said track and movable toward and away from the middle of said frame lengthwise of the track; each carriage comprising a rigid chassis having elements disposed generally equidistantly from opposite sides of said axis and latching means projecting downwardly from said elements adapting the carriage to connect with upper portions of a cargo container;

guide means on each carriage spaced longitudinally along said track in engageable relation with upper and lower surfaces of guide portions of the track to prevent tilting of said carriages relative to the track, said guide means being spaced longitudinally toward the middle of said base frame from said elements;

container-grappling mechanism on each carriage having a shaft extending through the chassis in bearing relation therewith and in normally-horizontal transverse relation with said axis, said shaft being spaced longitudinally inwardly toward the middle of said frame from said elements, and a pair of pickup arms in hinged relation with portions of the shaft in outward relation with the chassis, said arms having inturned termini adapted to engage the underneath of a container, means on the carriage for swinging the arms toward and away from each other, and means for rotating the shaft to effect vertical and horizontal positions of the arms; and means movably connecting each carriage and the track for traversing the carriages toward and away from each other.

2. Equipment for handling cargo containers including a spreader comprising:

a base frame providing an overhead track comprising a pair of parallel rails horizontally spaced with respect to a normally horizontal longitudinal axis of the spreader;

a pair of carriages suspended on said track, each comprising means engaging both rails enabling movements toward and away from each rollers spaced longitudinally along the track in engageable relation with upper and lower surfaces of flange portions of said rails to prevent tilting of said carriages relative to the track;

each carriage comprising a rigid chassis having elements disposed generally equidistantly in opposite directions from said axis and latching means projecting downwardly from said elements adapting the carriage to connect with upper portions of a container; and container grappling mechanism having a shaft extending through the chassis in radial and end-thrust bearing relationship therewith and in normally horizontal transverse relation with said axis at a level below said track, and a pair of pickup arms in hinged relation with portions of the shaft in outward relation with the chassis, said arms having inturned termini adapted to engage the underneath of a container, means carried on the shaft for swinging the arms toward and away from each other, and means for rotating the shaft to shift the arms between operating and retracted positions; and means disposed between the rails which movably connect each carriage and the base frame for traversing the carriages toward and away from each other;

said rollers being spaced longitudinally toward the middle of said base frame from said elements and said shaft being spaced longitudinally inwardly toward the middle of said frame from said elements.

3. The equipment of claim 2 wherein:

the means connecting said carriages and the base frame are a pair of fluid cylinder assemblies arranged between said rails in generally parallel relationship.

4. The equipment of claim 3 wherein:

the base frame comprises support means for said assemblies disposed between said rails adjacent a midpoint lengthwise of said rails, said support means being arranged to prevent lateral deflection of said assemblies.

5. The equipment of claim 3 wherein:

said shaft is disposed below the rails and said means for rotating the shaft on each carriage comprises a fluid cylinder assembly disposed out of longitudinal alignment with said means connecting the other carriage and the base frame.

6. The equipment of claim 5 wherein:

a piston rod of the fluid cylinder assembly of the means for rotating the shaft is connected in cranking relation with the shaft.

7. The equipment of claim 5 wherein:

a piston rod of the fluid cylinder of the means for rotating the shaft is connected in rack-and-pinion relation with the shaft.

References Cited

UNITED STATES PATENTS 3,458,229    7/1969    Nagy et al.   ------ 294—81 (SF)

ANDRES H. NIELSEN, Primary Examiner

U.S. Cl. X.R.

294—81

PO-1050
(5/69)

UNITED STATES PATENT OFFICE
CERTIFICATE OF CORRECTION

Patent No. 3,558,176     Dated January 26, 1971

Inventor(s) Jack E. Fathauer and Donald R. Whiteman

It is certified that error appears in the above-identified patent and that said Letters Patent are hereby corrected as shown below:

Column 2, line 23, change "FI7.8" to -- Fig. 8 --.

Column 3, line 5, change "horiznotally" to -- horizontally --.

Column 5, beginning at line 35, delete "means engaging both rails enabling movements toward and away from each".

Signed and sealed this 27th day of April 1971.

(SEAL)
Attest:

EDWARD M. FLETCHER, JR.
Attesting Officer

WILLIAM E. SCHUYLER, JR.
Commissioner of Patents